United States Patent
Xu (10) Patent No.: US 10,333,655 B2
(45) Date of Patent: Jun. 25, 2019

(54) METHOD AND DEVICE FOR IMPLEMENTING FLEXBILE HARQ TIMING BETWEEN BASE STATION AND TERMINAL

(71) Applicant: China Mobile Communications Corporation, Beijing (CN)

(72) Inventor: Xiaodong Xu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 85 days.

(21) Appl. No.: 15/581,621

(22) Filed: Apr. 28, 2017

(65) Prior Publication Data

US 2017/0230148 A1 Aug. 10, 2017

Related U.S. Application Data

(63) Continuation of application No. PCT/CN2015/093176, filed on Oct. 29, 2015.

(30) Foreign Application Priority Data

Oct. 31, 2014 (CN) .......................... 2014 1 0602535

(51) Int. Cl.
*H04L 1/18* (2006.01)
*H04L 5/14* (2006.01)
(Continued)

(52) U.S. Cl.
CPC .............. *H04L 1/1812* (2013.01); *H04L 1/18* (2013.01); *H04L 1/1887* (2013.01);
(Continued)

(58) Field of Classification Search
CPC ........ H04L 1/1812; H04L 5/14; H04W 88/08; H04W 88/02
See application file for complete search history.

(56) References Cited

U.S. PATENT DOCUMENTS 8,413,001 B2 4/2013 Zhu et al.
2002/0154600 A1 10/2002 Ido et al.
(Continued)

FOREIGN PATENT DOCUMENTS

| CN | 101237309 A | 8/2008 |
|---|---|---|
| CN | 101772073 A | 7/2010 |

(Continued)

OTHER PUBLICATIONS

International Search Report dated Feb. 2, 2016 in corresponding International Application No. PCT/CN2015/093176.
(Continued)

*Primary Examiner* — Walli Z Butt
(74) *Attorney, Agent, or Firm* — Mintz Levin Cohn Ferris Glovsky and Popeo, P.C.; Kongsik Kim; Jhongwoo Jay Peck (57) ABSTRACT

Disclosed are a method and device for implementing a flexible HARQ timing between a base station and a terminal. The method includes: acquiring a first reception processing delay parameter and a first transmission processing delay parameter of the terminal; and indicating an uplink/downlink HARQ timing between the base station and the terminal, based on the first reception processing delay parameter, the first transmission processing delay parameter and a processing delay parameter of the base station.

8 Claims, 4 Drawing Sheets

(51) Int. Cl.
H04W 88/02 (2009.01)
H04W 88/08 (2009.01)

(52) U.S. Cl.
CPC .............. *H04L 1/1896* (2013.01); *H04L 5/14* (2013.01); *H04W 88/02* (2013.01); *H04W 88/08* (2013.01)

(56) References Cited

U.S. PATENT DOCUMENTS

| | | |
|---|---|---|
| 2011/0138244 A1 | 6/2011 | Zhu et al. |
| 2013/0308464 A1* | 11/2013 | Park .................. H04W 72/0406 370/241 |
| 2015/0249980 A1* | 9/2015 | You ....................... H04L 1/1861 370/329 |
| 2016/0037552 A1 | 2/2016 | Svedman et al. |
| 2017/0117992 A1* | 4/2017 | Frederiksen .......... H04W 72/04 |

FOREIGN PATENT DOCUMENTS

| | | |
|---|---|---|
| CN | 102687451 A | 9/2012 |
| EP | 1225735 A1 | 7/2002 |
| WO | 2014153048 A1 | 9/2014 |

OTHER PUBLICATIONS

English Translation of the Written Opinion of the International Search Authority dated Feb. 2, 2016 in corresponding International Application No. PCT/CN2015/093176.
Supplementary European Search Report dated May 4, 2018 in corresponding EP Application No. 15854838.8.

* cited by examiner

METHOD AND DEVICE FOR IMPLEMENTING FLEXBILE HARQ TIMING BETWEEN BASE STATION AND TERMINAL

CROSS-REFERENCE TO RELATED APPLICATIONS

This application is a continuation application of International Application No. PCT/CN2015/093176 filed on Oct. 29, 2015, which claims priority to Chinese Patent Application No. 201410602535.6 filed on Oct. 31, 2014, which applications are incorporated herein by reference.

TECHNICAL FIELD

The present disclosure generally relates to communication techniques, and more particularly to a method and device for implementing a flexible Hybrid Automatic Repeat Request (HARQ) timing between a base station and a terminal.

BACKGROUND

Currently, a timing between a base station and a terminal may be set as follows: a time value is determined based on processing delays of a base station and individual terminals, and then the time value is set as a timing of all the terminals and the timing will not be changed over time. However, in practice, actual performances of the terminals may be different from one another, and thus setting a same timing for all the terminals may cause that the terminals with higher performances cannot be used effectively, resulting in a waste of resources. Furthermore, actual performance of each terminal may vary over time, and thus setting a fixed timing for the terminal may cause that the terminal cannot be used effectively during a higher-performance period of the terminal, resulting in a waste of resources.

SUMMARY

The present disclosure is desired to provide a method and device for implementing a flexible Hybrid Automatic Repeat Request (HARQ) between a base station and a terminal, which may dynamically determine timings of individual terminals based on delay processing capabilities of individual terminals, a processing capability of the base station, an actual requirement of a network and the like, so as to enable that timings of the terminals may vary from terminal to terminal and a timing of each terminal may vary over time, thus achieving effective utilization of resources of the terminals.

In view of the above, an embodiment of the disclosure provides a method for implementing a flexible HARQ timing between a base station and a terminal, including: acquiring a first reception processing delay parameter and a first transmission processing delay parameter of the terminal; and indicating an uplink/downlink HARQ timing between the base station and the terminal, based on the first reception processing delay parameter, the first transmission processing delay parameter and a processing delay parameter of the base station.

In an embodiment, the step of indicating the uplink/downlink HARQ timing between the base station and the terminal, based on the first reception processing delay parameter, the first transmission processing delay parameter and the processing delay parameter of the base station, may include: reconfiguring a second reception processing delay parameter and a second transmission processing delay parameter for the terminal, based on the first reception processing delay parameter and the first transmission processing delay parameter, where the second reception processing delay parameter is greater than or equal to the first reception processing delay parameter, and the second transmission processing delay parameter is greater than or equal to the first transmission processing delay parameter; summing the second reception processing delay parameter, the processing delay parameter of the base station, a previous statistical uplink/downlink propagation delay parameter and the second transmission processing delay parameter; and obtaining the uplink/downlink HARQ timing between the base station and the terminal based on the sum, wherein the uplink/downlink HARQ timing between the base station and the terminal is greater than or equal to the sum.

In an embodiment, the method may further include: adjusting the processing delay parameter of the base station based on a traffic state of the base station, where the step of indicating the uplink/downlink HARQ timing between the base station and the terminal may further include: indicating the uplink/downlink HARQ timing between the base station and the terminal based on the first reception processing delay parameter, the first transmission processing delay parameter and the adjusted processing delay parameter of the base station.

In an embodiment, before the step of acquiring the first reception processing delay parameter and the first transmission processing delay parameter, the method may further include: judging whether the terminal is to report the first reception processing delay parameter and the first transmission processing delay, and proceeding to the step of acquiring the first reception processing delay parameter and the first transmission processing delay parameter of the terminal when the terminal is to report the first reception processing delay parameter and the first transmission processing delay parameter.

In an embodiment, after the step of adjusting the processing delay parameter of the base station based on the traffic state of the base station, the method may further include: transmitting one of the second reception processing delay parameter, the second transmission processing delay parameter or the adjusted processing delay parameter of the base station, to the terminal, so as to enable the terminal to perform data transceiving based on one of the second reception processing delay parameter, the second transmission processing delay parameter or the adjusted processing delay parameter of the base station.

An embodiment of the disclosure also provides a device for implementing a flexible Hybrid Automatic Repeat Request (HARQ) timing between a base station and a terminal, including: an acquisition module, configured to acquire a first reception processing delay parameter and a first transmission processing delay parameter of the terminal; an indication module, configured to indicate an uplink/downlink HARQ timing between the base station and the terminal, based on the first reception processing delay parameter, the first transmission processing delay parameter and a processing delay parameter of the base station.

In an embodiment, the indication module may include: a configuration unit, configured to reconfigure a second reception processing delay parameter and a second transmission processing delay parameter for the terminal, based on the first reception processing delay parameter and the first transmission processing delay parameter; where the second reception processing delay parameter is greater than or equal to the first reception processing delay parameter, and the second transmission processing delay parameter is greater than or equal to the first transmission processing delay parameter; a calculation unit, configured to sum the second reception processing delay parameter, the processing delay parameter of the base station, a previous statistical uplink/downlink propagation delay parameter and the second transmission processing delay parameter; and a processing unit, configured to obtain the uplink/downlink HARQ timing between the base station and the terminal based on the sum, where the uplink/downlink HARQ timing between the base station and the terminal is greater than or equal to the sum.

In an embodiment, the indication module is further configured to: adjust the processing delay parameter of the base station based on a traffic state of the base station; and indicate the uplink/downlink HARQ timing between the base station and the terminal based on the first reception processing delay parameter, the first transmission processing delay parameter and the adjusted processing delay parameter of the base station.

In an embodiment, the device may further include: a judgment module, configured to judge whether the terminal is to report the first reception processing delay parameter and the first transmission processing delay, where the acquisition module acquires the first reception processing delay parameter and the first transmission processing delay parameter when the terminal is to report the first reception processing delay parameter and the first transmission processing delay parameter.

In an embodiment, the device may further include: a transmission module, configured to transmit one of the second reception processing delay parameter, the second transmission processing delay parameter or the adjusted processing delay parameter of the base station to the terminal, so as to enable the terminal to perform data transceiving based on one of the second reception processing delay parameter, the second transmission processing delay parameter or the adjusted processing delay parameter of the base station.

The above technical solutions of the embodiments of the disclosure have at least the following beneficial effects.

According to the method for implementing a flexible HARQ between a base station and a terminal, the base station may dynamically determine timings of individual terminals based on delay processing capabilities of individual terminals, a processing capability of the base station, an actual requirement of a network and the like, thus achieving effective utilization of resources of the terminals.

DETAILED DESCRIPTION

In order to make the technical problems to be solved, technical solutions and advantages of the disclosure to be clearer, the disclosure will be described in detail in conjunction with the appended drawings and embodiments of the disclosure.

In the related art, a HARQ timing between a baste station and a terminal is a fixed value (for example, for Frequency Division Duplexing (FDD) Long Term Evolution (LTE) in a LTE design, a HARQ timing between a base station and a terminal is fixed at 8 ms), the time value is set as a timing of all the terminals and the timing will not be changed over time. In view of this, the present disclosure provides a method and device for implementing a flexible Hybrid Automatic Repeat Request (HARQ) between a base station and a terminal, which may dynamically determine timings of individual terminals based on delay processing capabilities of individual terminals, a processing capability of the base station, an actual requirement of a network and the like, so as to enable that timings of the terminals may vary from terminal to terminal and the timing of each terminal may vary over time, thus achieving effective utilization of resources of the terminals.

Figure 1:
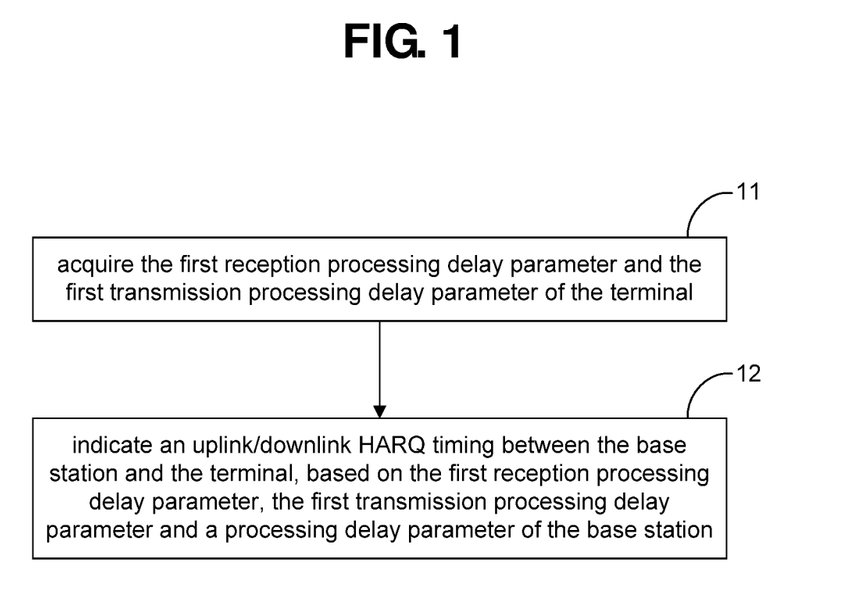
FIG. 1 is a flowchart of a method for implementing a flexible HARQ between a base station and a terminal according to an embodiment of the disclosure.

As shown in FIG. 1, an embodiment of the disclosure provides a method for implementing a flexible HARQ between a base station and a terminal, which includes the following steps.

In Step 11, a first reception processing delay parameter and a first transmission processing delay parameter of the terminal are acquired.

In Step 12, an uplink/downlink HARQ timing between the base station and the terminal are indicated based on the first reception processing delay parameter, the first transmission processing delay parameter and a processing delay parameter of the base station.

According to the embodiment of the disclosure, the terminal reports the first reception processing delay parameter and the first transmission processing delay parameter to the base station. The first reception processing delay parameter may be different from or same as the first transmission processing delay parameter, that is, it is possible that the first reception processing delay parameter and the first transmission processing delay parameter are integrally reported as a single delay parameter. The base station may update the uplink/downlink HARQ timing after receiving the first reception processing delay parameter and the first transmission processing delay parameter reported by the terminal. However, for the Time Division Duplexing (TDD), the uplink/downlink resources of the TDD are discontinuous due to the difference of the time domain resources between the TDD and the Frequency Division Duplexing (FDD). Therefore, for determining the HARQ timing of the TDD based on these delay parameters, an uplink/downlink subframe configuration ratio and available resources will be considered. Optionally, according to the embodiment of the disclosure, before the Step 11, the method may further include the following step:

It is judged whether the terminal is to report the first reception processing delay parameter and the first transmission processing delay; when the terminal is to report the first reception processing delay parameter and the first transmission processing delay parameter, the method proceeds with the step of acquiring the first reception processing delay parameter and the first transmission processing delay parameter; and when the terminal is not to report the first reception processing delay parameter and the first transmission processing delay parameter, a preset default uplink/downlink HARQ timing between the terminal and the base station is adopted.

According to an embodiment of the disclosure, preferably, the base station indicates the uplink/downlink HARQ timing between the terminal and the base station based on a traffic state of the base station, where the traffic state may include at least one of a traffic delay demand, an idle/busy state of the base station and an operation mode of the base station.

According to an embodiment of the disclosure, for a certain traffic delay demand and a certain operation mode of the base station, a processing delay parameter of the base station is positively correlated to how busy the base station is, that is, the processing delay parameter of the base station when the base station is relatively busy, is greater than the processing delay parameter of the base station when the base station is relatively idle. Similarly, for a certain idle/busy state of the base station and a certain operation mode of the base station, the processing delay parameter of the base station is positively correlated to the traffic delay demand, that is, the smaller the traffic delay demand is, the smaller the processing delay parameter of the base station is. For a certain idle/busy state of the base station and a certain traffic delay demand, the processing delay parameter of the base station varies depending on the operation mode of the base station.

Figure 2:
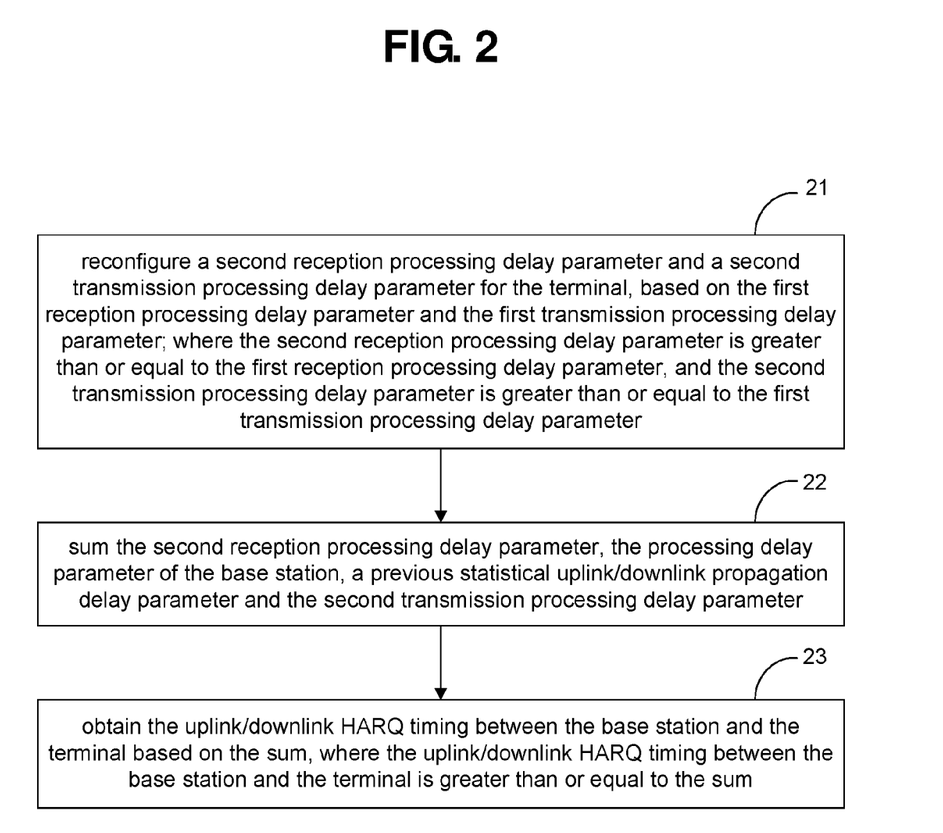
FIG. 2 is a flowchart of the step 12 in FIG. 1 according to an embodiment of the disclosure.

According to an embodiment of the disclosure, as shown in FIG. 2, the Step 12 may include the following steps.

In Step 21, a second reception processing delay parameter and a second transmission processing delay parameter is reconfigured for the terminal, based on the first reception processing delay parameter and the first transmission processing delay parameter, where the second reception processing delay parameter is greater than or equal to the first reception processing delay parameter, and the second transmission processing delay parameter is greater than or equal to the first transmission processing delay parameter.

In Step 22, the second reception processing delay parameter, the processing delay parameter of the base station, a previous statistical uplink/downlink propagation delay parameter and the second transmission processing delay parameter are summed.

In Step 23, the uplink/downlink HARQ timing between the base station and the terminal is obtained based on the sum, where the uplink/downlink HARQ timing between the base station and the terminal is greater than or equal to the sum.

According to the embodiment of the disclosure, the base station will reconfigure the second reception processing delay parameter and the second transmission processing delay parameter for the terminal, after receiving the first reception processing delay parameter and the first transmission processing delay parameter reported by the terminal, where the second reception processing delay parameter is greater than or equal to the first reception processing delay parameter, and the second transmission processing delay parameter is greater than or equal to the first transmission processing delay parameter. It should be understood that the second reception processing delay parameter may be same as or different from the second transmission processing delay parameter. After the second reception processing delay parameter and the second transmission processing delay parameter are configured, the base station will sum the second reception processing delay parameter, the processing delay parameter of the base station, a previous statistical uplink/downlink propagation delay parameter and the second transmission processing delay parameter. The uplink/downlink HARQ timing between the base station and the terminal is greater than or equal to the sum of the second reception processing delay parameter, the processing delay parameter of the base station, a previous statistical uplink/downlink propagation delay parameter and the second transmission processing delay parameter, and the uplink/downlink HARQ timing between the base station and the terminal is an integer number. The method for acquiring the uplink/downlink propagation delay parameter can be found in the related art, and thus will not be elaborated.

Figure 3:
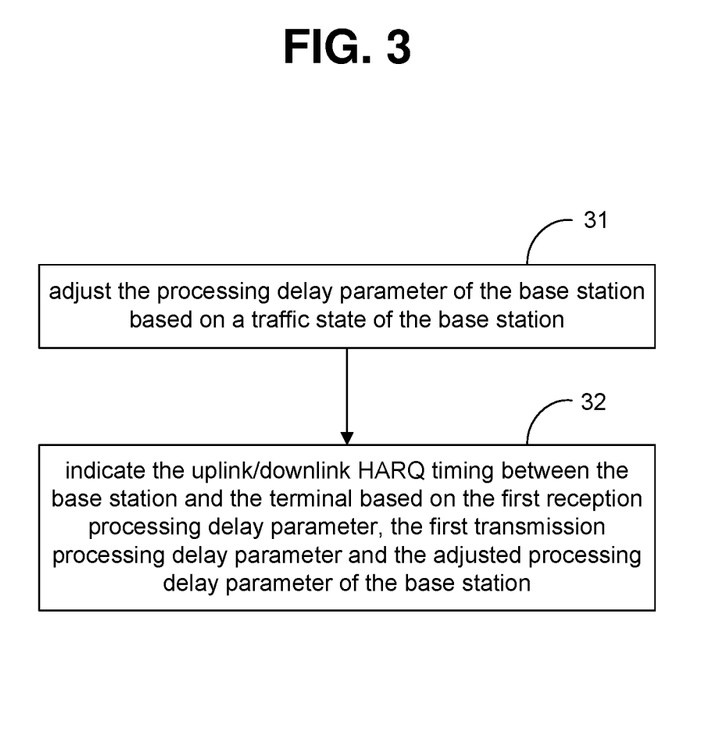
FIG. 3 is a flowchart of the step of indicating the uplink/downlink HARQ timing between the base station and the terminal based on a traffic state according to an embodiment of the disclosure.

According to the embodiment of the disclosure, as shown in FIG. 3, the step of indicating the uplink/downlink HARQ timing between the base station and the terminal may further include the following steps.

In Step 31, the processing delay parameter of the base station is adjusted based on a traffic state of the base station; and In Step 32, the uplink/downlink HARQ timing between the base station and the terminal is indicated based on the first reception processing delay parameter, the first transmission processing delay parameter and the adjusted processing delay parameter of the base station.

According to the embodiment of the disclosure, for a certain traffic delay demand and a certain operation mode of the base station, after the base station receives the first reception processing delay parameter and the first transmission processing delay parameter reported by the terminal, the base station will increase the processing delay parameter of the base station corresponding to the terminal when the base station is relatively busy, and the base station will decrease the processing delay parameter of the base station corresponding to the terminal when the base station is relatively idle. Similarly, for a certain idle/busy state of the base station and a certain operation mode of the base station, after the base station receives the first reception processing delay parameter and the first transmission processing delay parameter reported by the terminal, the base station will adjust the processing delay of the base station based on the traffic delay demand, that is, the base station will decrease the processing delay of the base station when the traffic delay demand decrease. For a certain traffic delay demand and a certain idle/busy state of the base station, the base station will adjust the processing delay of the station based on the operation mode of the base station. Both the uplink propagation delay parameter and the downlink propagation delay parameter are maximum system-allowable propagation delay parameter positively correlated to a coverage radius set by the base station. At this time, the base station will set the HARQ timing to be greater than or equal to the sum of the second reception processing delay parameter, the previous statistical uplink/downlink propagation delay parameter, the second transmission processing delay parameter and the adjusted processing delay parameter of the base station.

Optionally, according to the embodiment of the disclosure, after the step of adjusting the processing delay parameter of the base station based on the traffic state of the base station, the method may further include a step of transmitting one of the second reception processing delay parameter, the second transmission processing delay parameter or the adjusted processing delay parameter of the base station, to the terminal, so as to enable the terminal to perform data transceiving based on one of the second reception processing delay parameter, the second transmission processing delay parameter or the adjusted processing delay parameter of the base station.

According to the embodiment of the disclosure, after the base station adjusts the processing delay parameter of the base station and the reception processing delay parameter of the terminal, the terminal will perform data reception based on the adjusted processing delay parameter of the base station and the second reception processing delay parameter. After the base station adjusts the processing delay parameter of the base station and the transmission processing delay parameter of the terminal, the terminal will perform data transmission based on the adjusted processing delay parameter of the base station and the second transmission processing parameter. Of course, when the base station does not adjust any one of the reception processing delay parameter of the terminal, the transmission processing delay parameter of the terminal and the processing delay parameter of the base station, a default HARQ timing is taken as the HARQ timing between the base station and the terminal.

Figure 4:
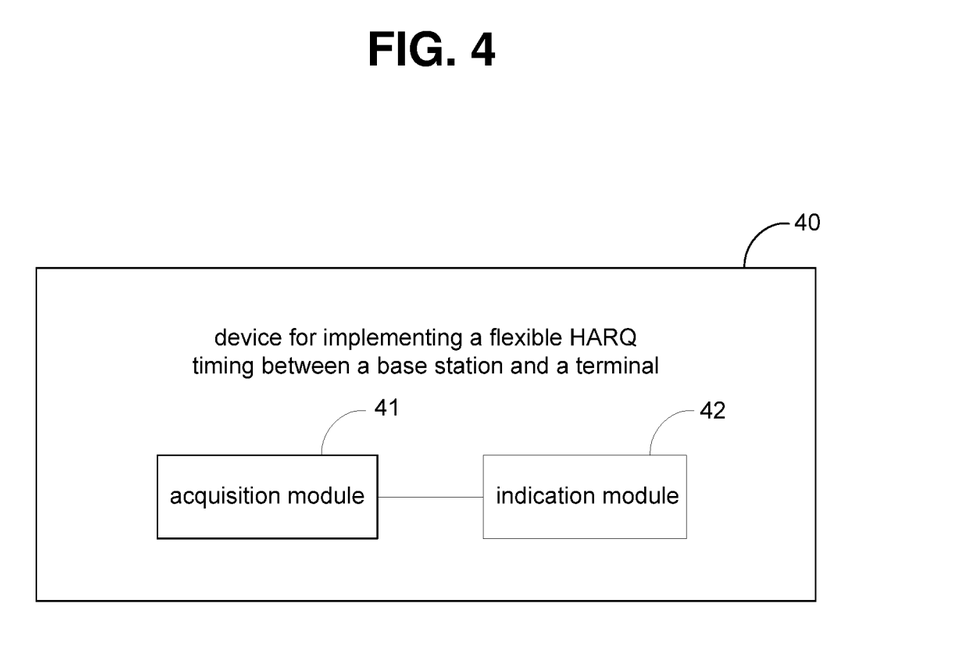
FIG. 4 is a structural schematic diagram of a device for implementing a flexible HARQ between a base station and a terminal according to an embodiment of the disclosure.

For better achieving the above object, as shown in FIG. 4, an embodiment of the disclosure provides a device 40 for implementing a flexible HARQ timing between a base station and a terminal, which includes an acquisition module 41 and an indication module 42.

The acquisition module 41 is configured to acquire a first reception processing delay parameter and a first transmission processing delay parameter of the terminal.

The indication module 42 is configured to indicate an uplink/downlink HARQ timing between the base station and the terminal, based on the first reception processing delay parameter, the first transmission processing delay parameter and a processing delay parameter of the base station.

Preferably, the device 4 may further include a judgement module, configured to judge whether the terminal is to report the first reception processing delay parameter and the first transmission processing delay, where the acquisition module acquires the first reception processing delay parameter and the first transmission processing delay parameter when the terminal is to report the first reception processing delay parameter and the first transmission processing delay parameter.

Preferably, the indication module 42 may further include a configuration unit, a calculation unit and a processing unit.

The configuration unit is configured to reconfigure a second reception processing delay parameter and a second transmission processing delay parameter for the terminal, based on the first reception processing delay parameter and the first transmission processing delay parameter; where the second reception processing delay parameter is greater than or equal to the first reception processing delay parameter, and the second transmission processing delay parameter is greater than or equal to the first transmission processing delay parameter;

The calculation unit is configured to sum the second reception processing delay parameter, the processing delay parameter of the base station, a previous statistical uplink/downlink propagation delay parameter and the second transmission processing delay parameter; and The processing unit is configured to obtain the uplink/downlink HARQ timing between the base station and the terminal based on the sum, where the uplink/downlink HARQ timing between the base station and the terminal is greater than or equal to the sum.

Preferably, the indication module 42 may further be configured to: adjust the processing delay parameter of the base station based on a traffic state of the base station; and indicate the uplink/downlink HARQ timing between the base station and the terminal based on the first reception processing delay parameter, the first transmission processing delay parameter and the adjusted processing delay parameter of the base station.

Preferably, the device 40 may further include a transmission module, configured to transmit one of the second reception processing delay parameter, the second transmission processing delay parameter or the adjusted processing delay parameter of the base station to the terminal, so as to enable the terminal to perform data transceiving based on one of the second reception processing delay parameter, the second transmission processing delay parameter or the adjusted processing delay parameter of the base station.

Those skilled in the art shall understand that the embodiments of the disclosure may be provided as a method, a device (apparatus) or a computer program product. Thus, forms of hardware embodiments, software embodiments or embodiments integrating software and hardware may be adopted in the disclosure. Moreover, a form of the computer program product implemented on one or more computer available storage media (including but not limited to, a disk memory, a Compact Disc Read-Only Memory (CD-ROM), an optical memory and the like) containing computer available program codes may be adopted in the disclosure.

The disclosure is described with reference to flow charts and/or block diagrams of the method, the device (apparatus) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

The above-described embodiments are preferred embodiments of the disclosure. It should be noted that, the skilled in the art may make various improvements and modifications on the disclosure without departing from the spirit and scope of the disclosure, which may fall within the protection scope of the disclosure.

The invention claimed is:

1. A method for implementing a flexible Hybrid Automatic Repeat Request (HARQ) timing between a base station and a terminal, comprising:

acquiring a first reception processing delay parameter and a first transmission processing delay parameter of the terminal; and indicating an uplink/downlink HARQ timing between the base station and the terminal, based on the first reception processing delay parameter, the first transmission processing delay parameter and a processing delay parameter of the base station, wherein the step of indicating the uplink/downlink HARQ timing between the base station and the terminal, based on the first reception processing delay parameter, the first transmission processing delay parameter and the processing delay parameter of the base station, comprises;

reconfiguring a second reception processing delay parameter and a second transmission processing delay parameter for the terminal, based on the first reception processing delay parameter and the first transmission processing delay parameter, wherein the second reception processing delay parameter is greater than or equal to the first reception processing delay parameter, and the second transmission processing delay parameter is greater than or equal to the first transmission processing delay parameter;

summing the second reception processing delay parameter, the processing delay parameter of the base station, a previous statistical uplink-downlink propagation delay parameter and the second transmission processing delay parameter; and obtaining the uplink/downlink HARQ timing between the base station and the terminal based on the sum, wherein the uplink/downlink HARQ timing between the base station and the terminal is greater than or equal to the sum.

2. The method according to claim 1, further comprising:
adjusting the processing delay parameter of the base station based on a traffic state of the base station,
wherein the step of indicating the uplink/downlink HARQ timing between the base station and the terminal further comprises:
indicating the uplink/downlink HARQ timing between the base station and the terminal based on the first reception processing delay parameter, the first transmission processing delay parameter and the adjusted processing delay parameter of the base station.

3. The method according to claim 1, wherein before the step of acquiring the first reception processing delay parameter and the first transmission processing delay parameter of the terminal, the method further comprises:
judging whether the terminal is to report the first reception processing delay parameter and the first transmission processing delay, and proceeding to the step of acquiring the first reception processing delay parameter and the first transmission processing delay parameter of the terminal when the terminal is to report the first reception processing delay parameter and the first transmission processing delay parameter.

4. The method according to claim 2, wherein after the step of adjusting the processing delay parameter of the base station based on the traffic state of the base station, the method further comprises:
transmitting one of the second reception processing delay parameter, the second transmission processing delay parameter or the adjusted processing delay parameter of the base station, to the terminal, so as to enable the terminal to perform data transceiving based on one of the second reception processing delay parameter, the second transmission processing delay parameter or the adjusted processing delay parameter of the base station.

5. A device for implementing a flexible Hybrid Automatic Repeat Request (HARQ) timing between a base station and a terminal, the device comprising:

a memory configured to store a computer program; and
a processor configured to execute the computer program, which when executed causes the processor to perform steps comprising;

acquiring a first reception processing delay parameter and a first transmission processing delay parameter of the terminal; and indicating an uplink/downlink HARQ timing between the base station and the terminal, based on the first reception processing delay parameter, the first transmission processing delay parameter and a processing delay parameter of the base station, wherein the step of indicating the uplink/downlink HARQ timing between the base station and the terminal, based on the first reception processing delay parameter, the first transmission processing delay parameter and the processing delay parameter of the base station, comprises:

reconfiguring a second reception processing delay parameter and a second transmission processing delay parameter for the terminal, based on the first reception processing delay parameter and the first transmission processing delay parameter, wherein the second reception processing delay parameter is greater than or equal to the first reception processing delay parameter, and the second transmission processing delay parameter is greater than or equal to the first transmission processing delay parameter;

summing the second reception processing delay parameter, the processing delay parameter of the base station, a previous statistical uplink/downlink propagation delay parameter and the second transmission processing delay parameter; and obtaining the uplink/downlink HARQ timing between the base station and the terminal based on the sum, wherein the uplink/downlink HARQ timing between the base station and the terminal is greater than or equal to the sum.

6. The device according to claim 5, wherein
the processor is configured to execute the computer program to perform the steps further comprising:
adjusting the processing delay parameter of the base station based on a traffic state of the base station,
wherein the step of indicating the uplink/downlink HARQ timing between the base station and the terminal further comprises:
indicating the uplink/downlink HARQ timing between the base station and the terminal based on the first reception processing delay parameter, the first transmission processing delay parameter and the adjusted processing delay parameter of the base station.

7. The device according to claim 5, wherein before the step of acquiring the first reception processing delay parameter and the first transmission processing delay parameter of the terminal, the method further comprises:
judging whether the terminal is to report the first reception processing delay parameter and the first transmission processing delay, and proceeding to the step of acquiring the first reception processing delay parameter and the first transmission processing delay parameter of the terminal when the terminal is to report the first reception processing delay parameter and the first transmission processing delay parameter.

8. The device according to claim 6, wherein after the step of adjusting the processing delay parameter of the base station based on the traffic of the base, the method further comprises:

transmitting one of the second reception processing delay parameter, the second transmission processing delay parameter or the adjusted processing delay parameter of the base station, to the terminal, so as to enable the terminal to perform data transceiving based on one of the second reception processing delay parameter, the second transmission processing delay parameter or the adjusted processing delay parameter of the base station.

* * * * *